United States Patent
Wang et al.

(10) Patent No.: US 10,812,703 B2
(45) Date of Patent: Oct. 20, 2020

(54) VIRTUAL REALITY DEVICE, METHOD FOR ADJUSTING FOCAL LENGTHS AUTOMATICALLY, METHOD FOR PRODUCING VIRTUAL REALITY DEVICE AND COMPUTER READABLE MEDIUM

(71) Applicants: Beijing BOE Display Technology Co., Ltd., Beijing (CN); BOE Technology Group Co., Ltd., Beijing (CN)

(72) Inventors: Mingchao Wang, Beijing (CN); Yanqiu Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/379,737

(22) Filed: Apr. 9, 2019

(65) Prior Publication Data
US 2020/0092462 A1    Mar. 19, 2020

(30) Foreign Application Priority Data
Sep. 18, 2018    (CN) .......................... 2018 1 1091134

(51) Int. Cl.
*H04N 5/232*    (2006.01)
*G02B 26/02*    (2006.01)
(Continued)

(52) U.S. Cl.
CPC ......... *H04N 5/23212* (2013.01); *G02B 26/02* (2013.01); *G06T 7/80* (2017.01);
(Continued)

(58) Field of Classification Search
CPC ............. H04N 5/23212; H04N 5/2253; H04N 5/2254; H04N 5/247; G02B 26/02;
(Continued)

(56) References Cited

U.S. PATENT DOCUMENTS 8,508,830 B1 *  8/2013  Wang ................... G02B 3/0006
                                                               359/267
8,628,196 B2    1/2014  Song et al.
(Continued)

FOREIGN PATENT DOCUMENTS

CN      101414425 A    4/2009
CN      106406517 A    2/2017
(Continued)

OTHER PUBLICATIONS

First Office Action, including Search Report, for Chinese Patent Application No. 201811091134.3, dated Apr. 28, 2020, 17 pages.

*Primary Examiner* — Lin Ye
*Assistant Examiner* — John H Morehead, III
(74) *Attorney, Agent, or Firm* — Westman, Champlin & Koehler, P.A.

(57) ABSTRACT

A virtual reality device, a method for adjusting focal lengths automatically, a method for producing the virtual reality device and a computer readable medium are provided. The virtual reality device includes: at least one imaging device comprising an imaging portion and an elastic micro lens array, the elastic micro lens array being arranged at a light incident side of the imaging portion and configured to modulate an incident light, the imaging portion being configured to receive the incident light modulated by the elastic micro lens array and to convert intensity of the incident light into an electrical imaging signal; and a display device configured to generate a visual image from the electrical imaging signal outputted by the imaging portion, wherein the elastic micro lens array has lenses which have independently adjustable focal lengths.

17 Claims, 7 Drawing Sheets (51) Int. Cl.
*H04N 5/225* (2006.01)
*H04N 5/247* (2006.01)
*G06T 7/80* (2017.01)
*G06F 1/16* (2006.01)

(52) U.S. Cl.
CPC .......... *H04N 5/2253* (2013.01); *H04N 5/2254* (2013.01); *H04N 5/247* (2013.01); *G06F 1/163* (2013.01); *G06T 2207/20084* (2013.01)

(58) Field of Classification Search
CPC .......... G02B 27/0172; G02B 2027/014; G06T 2207/20084; G06T 7/80
See application file for complete search history.

(56) References Cited

U.S. PATENT DOCUMENTS

| | | |
|---|---|---|
| 2011/0051091 A1 | 3/2011 | Song et al. |
| 2015/0234187 A1* | 8/2015 | Lee .................. G02C 7/085 |
| | | 345/8 |
| 2016/0191893 A1* | 6/2016 | Gewickey ............ H04N 13/388 |
| | | 386/223 |
| 2017/0038590 A1* | 2/2017 | Jepsen ................. G09G 3/3426 |
| 2017/0168307 A1* | 6/2017 | Itani ....................... G02B 7/287 |
| 2017/0352771 A1* | 12/2017 | Gu ...................... G02B 19/0014 |
| 2018/0008141 A1* | 1/2018 | Krueger ................... A61B 5/11 |
| 2018/0095275 A1* | 4/2018 | Nakajima ........... H04N 5/23287 |
| 2018/0196263 A1 | 7/2018 | Vallius et al. |
| 2018/0247968 A1* | 8/2018 | Na .................... H01L 27/14634 |

FOREIGN PATENT DOCUMENTS

| | | |
|---|---|---|
| CN | 106412400 A | 2/2017 |
| CN | 206039053 U | 3/2017 |
| CN | 106896432 A | 6/2017 |
| CN | 107783291 A | 3/2018 |
| CN | 107942517 A | 4/2018 |
| CN | 107993260 A | 5/2018 |
| WO | 2014066662 A1 | 5/2014 |

* cited by examiner

|   | 0 | 1 | 2 | 3 | ... | n |
|---|---|---|---|---|---|---|
| 0 | [1.0,1.0,2.0] | [1.0,1.0,2.0] | [1.0,1.0,2.0] | [1.0,1.0,1.0] | ... | [1.0,1.0,3.0] |
| 1 | [1.0,1.0,2.1] | [1.0,1.0,2.2] | [1.0,1.0,2.3] | [1.0,1.0,2.4] | ... | [1.0,1.0,2.4] |
| 2 | [1.0,1.0,2.2] | [1.0,1.0,2.3] | [1.0,2.0,2.4] | [2.0,2.0,2.5] | ... | [2.7,2.0,2.5] |
| 3 | [1.0,1.0,2.3] | [1.0,1.5,2.4] | [1.0,2.0,2.5] | [2.0,3.0,2.6] | ... | [2.7,3.0,2.6] |
| 4 | [1.0,1.0,2.4] | [1.0,1.5,2.5] | [1.0,2.0,2.6] | [2.0,2.0,2.7] | ... | [2.7,2.0,2.7] |
| 5 | [1.0,1.0,2.5] | [1.0,1.0,2.6] | [1.0,1.0,2.7] | [2.0,2.5,2.8] | ... | [2.7,2.5,2.8] |
| 6 | [1.0,1.0,2.6] | [1.0,1.5,2.7] | [1.0,1.0,2.8] | [2.6,2.0,2.9] | ... | [2.6,2.0,2.9] |
| ... | ... | ... | ... | ... | ... | ... |
| n | [1.0,2.0,3.6] | [1.0,1.0,2.7] | [2.0,3.0,2.6] | [2.7,2.0,2.7] | ... | [2.0,2.7,2.9] |

VIRTUAL REALITY DEVICE, METHOD FOR ADJUSTING FOCAL LENGTHS AUTOMATICALLY, METHOD FOR PRODUCING VIRTUAL REALITY DEVICE AND COMPUTER READABLE MEDIUM

CROSS-REFERENCE TO RELATED APPLICATION

This application claims priority to Chinese Patent Application No. 201811091134.3, filed on 18 Sep. 2018, incorporated herein by reference in their entirety.

TECHNICAL FIELD

Embodiments of the present disclosure relate to the technical field of virtual reality, and more particularly, to a virtual reality device and a method for adjusting focal lengths used in the virtual reality device automatically, a method for producing the virtual reality device and a computer readable medium.

BACKGROUND

VR (Virtual Reality) means that virtual information is used in reality world such that real environment and virtual object are superposed in real-time in one same picture or one same space.

The current virtual reality device judges a distance between a user and a display device mainly by for example infrared distance meters or gyroscopes, so as to adjust a distance between the display device and lenses manually by various polarization systems or provide sophisticated databases to adjust best distance of distinct vision. It can allow the user to be immersed deeply.

SUMMARY

Embodiments of the present disclosure provide a virtual reality device, comprising: at least one imaging device comprising an imaging portion and an elastic micro lens array, the elastic micro lens array being arranged at a light incident side of the imaging portion and configured to modulate an incident light, and the imaging portion being configured to receive the incident light modulated by the elastic micro lens array and to convert intensity of the incident light into an electrical imaging signal; and a display device configured to generate a visual image from the electrical imaging signal outputted by the imaging portion, wherein the elastic micro lens array has lenses which have independently adjustable focal lengths.

In some embodiments, the virtual reality device further comprises: a processor configured to adjust the focal lengths of the lenses in the elastic micro lens array depending on predetermined image data.

In some embodiments, the processor is further configured to acquire the predetermined image data and process the acquired predetermined image data by a neural work model to optimize the focal lengths of the lenses in the elastic micro lens array.

In some embodiments, the imaging device further comprises a flexible substrate made from an electrically-induced deformable flexible material, and wherein the imaging portion comprises at least one photosensitive element on the flexible substrate.

In some embodiments, the elastic micro lens array is arranged on the flexible substrate to cover the at least one photosensitive element.

In some embodiments, the imaging device further comprises a first electrode and a second electrode; the elastic micro lens array and the flexible substrate are arranged between the first electrode and the second electrode, and wherein the virtual reality device further comprises a processor configured to adjust the focal lengths of the lenses in the elastic micro lens array by controlling voltages applied to the first electrode and the second electrode.

In some embodiments, the elastic micro lens array and the flexible substrate are spaced from each of the first electrode and the second electrode.

In some embodiments, the first electrode comprises a plurality of first sub-electrodes electrically insulated from each other; and wherein the second electrode comprises a plurality of second sub-electrodes electrically insulated from each other.

In some embodiments, each of the first sub-electrodes and the second sub-electrodes has a mesh structure.

In some embodiments, the imaging portion further comprises a cavity, the elastic micro lens array, the flexible substrate, the imaging portion, the first electrode and the second electrode being encapsulated in the cavity.

In some embodiments, the electrically-induced deformable flexible material comprises polyurethane elastomer.

In some embodiments, a material of the elastic micro lens array comprises a transparent polymer material.

In some embodiments, the imaging device is transparent.

In some embodiments, the virtual reality device further comprises a frame, wherein the at least one imaging device comprises a first imaging device and a second imaging device arranged within the frame and separated from each other.

In some embodiments, the virtual reality device further comprises: a main observation board comprising a first through hole for left eye's observation and a second through hole for right eye's observation; and a groove for receiving a cell phone, the groove being arranged on a side of the frame facing away from the main observation board, wherein an orthographic projection of the first imaging device on the main observation board at least partly overlaps the first through hole and an orthographic projection of the second imaging device on the main observation board at least partly overlaps the second through hole.

Embodiments of the present disclosure provide a method for adjusting focal lengths automatically used in the virtual reality device as described above, the method comprising: adjusting the focal lengths of micro lenses in the elastic micro lens array depending on the predetermined image data until the display device displays a clear image.

In some embodiments, the adjusting the focal lengths of micro lenses in the elastic micro lens array depending on the predetermined image data until the display device displays a clear image comprises: acquiring the predetermined image data and processing the acquired predetermined image data by a neural work model to optimize the focal lengths of the lenses in the elastic micro lens array.

Embodiments of the present disclosure provide a computer readable medium on which a computer program is stored, the computer program being configured to perform the method as described above when the computer program is executed.

Embodiments of the present disclosure provide a method for producing the virtual reality device as described above, the method comprising: producing at least one imaging device comprising the imaging portion and the elastic micro lens array, and arranging the elastic micro lens array on the light incident side of the imaging portion; and producing the display device.

In some embodiments, the producing at least one imaging device comprises: forming a flexible substrate from an electrically-induced deformable flexible material; producing at least one photosensitive element on the flexible substrate to form the imaging portion; producing the elastic micro lens array on the flexible substrate to cover the at least one photosensitive element; and producing a first electrode on a side of the elastic micro lens array facing away from the flexible substrate and producing a second electrode on a side of the flexible substrate facing away from the elastic micro lens array.

BRIEF DESCRIPTION OF THE DRAWINGS

In order to explain solutions of embodiments of the present disclosure more explicitly, drawings for describing the embodiments will be explained briefly below. It is apparent that the following drawings are only intended to show some of embodiments of the present disclosure. The skilled person in the art can obtain other drawings according to these drawings without any creative efforts.

DETAILED DESCRIPTION OF EMBODIMENTS

Technical solutions of the present disclosure will be described clearly and completely with reference to the drawings of the embodiments in the present disclosure. It is apparent that the described embodiments are only part of embodiments of the present disclosure, rather than all of the embodiments. On the basis of the embodiments of the present disclosure, all of other embodiments that can be obtained by the skilled person in the art without any creative efforts also belong to the scope of the present disclosure.

It will be appreciated by those skilled in the art that the following description of embodiments is intended to explain and describe the generic concept of the present disclosure, instead of limiting the present disclosure. In addition, the same reference numbers are used throughout the description and drawings for the same or similar components or members. For the sake of clarity, in the drawings, the parts are not necessarily drawn to scale. And some known parts and structures may be omitted in the drawings.

Unless otherwise defined, technical terms or scientific terms used herein refer to the ordinary meaning as understood by those skilled in the art. The words "first", "second" and the like used in the present disclosure are not intended to indicate any order, quantity, or priority, but are merely used to distinguish different components. In the present disclosure, the phrase of "a" or "an" does not exclude "more than one". The phrase such as "include" or "comprise" and the like means that the element or object before the phrase covers the elements or objects and their equivalents listed behind the phrase instead of excluding other elements or objects. The phrases of "connection" or "connecting" or the like are not limited to the physical or mechanical connection, but may include electrical connection whether directly or indirectly. In addition, in the following description of the present disclosure, the orientation terms, such as "upper", "lower", "left", "right", "top" or "bottom" etc., are only used to indicate relative positions. After the absolute position of the described objects has been changed, the relative positions may be changed correspondingly. When an element such as a layer, a film, an area or a base substrate is called to be located "above" or "below" another element, the element may be located "directly" above or below the another element, or an intermediate element may be provided between them.

Some embodiments of the present disclosure provide a virtual reality device. The virtual reality device may include: at least one imaging device 20 and a display device 60. As an example, in FIG. 1, two imaging devices 20 are shown, i.e., a first imaging device 201 and a second imaging device 202, for example, they may be used for the left eye and the right eye of a user respectively. However, in embodiments of the present disclosure, the number of the imaging devices 20 is not limited to this. Alternatively, one, three or more imaging devices may also be provided.

Figure 3:
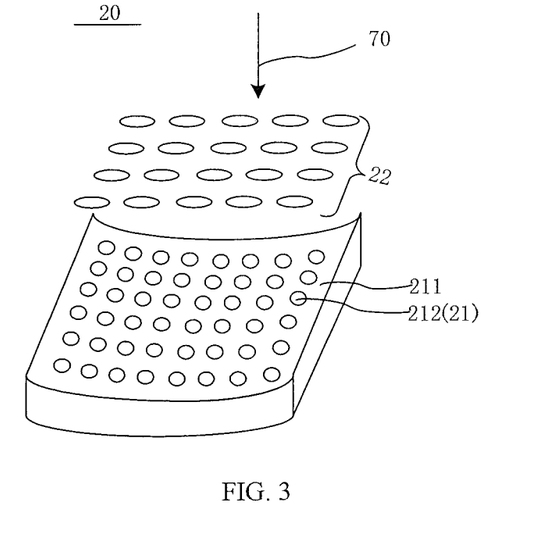
FIG. 3 is a schematic view of an imaging device provided by some embodiments of the present disclosure.

In some embodiments, as shown in FIG. 3, the imaging device 20 may include an imaging portion 21 and an elastic micro lens array 22. The elastic micro lens array 22 is arranged at a light incident side of the imaging portion 21 and configured to modulate an incident light 70. The imaging portion 21 is configured to receive the incident light 70 modulated by the elastic micro lens array 22 and to convert intensity of the incident light 70 into an electrical imaging signal. The display device 60 for example a display screen, is configured to generate a visual image from the electrical imaging signal outputted by the imaging portion 21, to be observed by eyes. One or more display devices 60, for example, two display devices, may be provided as required.

In some embodiments, the imaging portion 21 may be arranged to simulate retinas of eyes of human to generate an image, for example, the imaging portion 21 may include a plurality of photosensitive elements on a hemispherical surface. In some embodiments, all micro lenses in the elastic micro lens array 22 may deform independently. In this way, when the incident light 70 passes through the elastic micro lens array 22, respective micro lenses in the elastic micro lens array 22 may produce different modulations on the intensity distribution of the incident light 70. The specific modulation applied to the intensity by the respective micro lenses in the elastic micro lens array 22 may be achieved for example by inputting special image data. In some embodiments, the focal lengths of micro lenses in the elastic micro lens array 22 can be adjusted independently from each other. It may for example be achieved by adjusting positions and deformations of the respective micro lenses in the elastic micro lens array 22. It is helpful to enhance resolution of images.

In some embodiments, the virtual reality device may further include a processor 30. The processor 30 is configured to adjust the focal lengths of the lenses in the elastic micro lens array 22 depending on predetermined image data such that the display device 60 can show a clear visual image.

In this way, when the focal lengths of micro lenses in the elastic micro lens array 22 are adjusted by the processor 30 until the visual image produced by the display device 60 from the electrical imaging signal outputted by the imaging portion 21 becomes clear, it means that the eyes of human can see clear images at these focal lengths. In some embodiments, the imaging portion 21 may be arranged to simulate retinas of eyes of human to generate an image and when the user wears the virtual reality device according to the embodiments of the present disclosure, the imaging portion 21 may be located between the elastic micro lens array 22 and the eyes.

In some embodiments, parts constituting the imaging device 20 (for example, the imaging portion 21 and the elastic micro lens array 22) may be transparent.

The elastic micro lens array 22 is elastic, thus it is easy to control it to deform so as to change focal lengths of micro lenses in the elastic micro lens array 22.

Embodiments of the present disclosure provide a virtual reality device. The imaging device 20 including the imaging portion 21 and the elastic micro lens array 22 is arranged in the virtual reality device. In this way, when the processor 30 adjusts the focal lengths of the lenses in the elastic micro lens array 22 such that the display device 60 can generate a clear image from the electrical imaging signal outputted by the imaging portion 21, the user may see the clear image so that the virtual reality device according to the embodiments of the present disclosure can have better immersing effects. In addition, the above process of adjusting focal lengths is automatic without manual adjustments and adjustments based on external device, thus it can allow the virtual reality device to be more independent. It can improve the user's experiences.

In some embodiments, as shown in FIG. 3, the imaging device 20 may further include a flexible substrate 211. The imaging portion 21 may include at least one photosensitive element 212 on the flexible substrate 211. The flexible substrate 211 is made from an electrically-induced deformable flexible material. In some embodiments, as shown in FIG. 3, the imaging portion 21 includes a plurality of photosensitive elements 212.

It should be understood that the photosensitive elements 212 are configured to convert an optical signal into an electrical signal (i.e., the above electrical imaging signal). In order to output the electrical signal, it will arrange wires connected to the photosensitive elements 212. Thus, the wires connected to the photosensitive elements 212 may be formed on the flexible substrate 211.

In some embodiments, the photosensitive elements 212 may be produced by the same process as those of producing diodes, or may be produced by the same process as those of producing thin film transistors well-known in the semiconductor industry. When the photosensitive elements 212 are produced by the processes of producing thin film transistors well-known in the semiconductor industry, good photosensitivity of an active layer needs to be ensured during the producing process, i.e., the active layer is made from a photosensitive material.

Use of the electrically-induced deformable material as the material of the flexible substrate 211 can allow the flexible substrate 211 to deform in an electric field, to form a semispherical shape. Since the photosensitive elements 212 are located on the flexible substrate 211, thus, the imaging portion 21 may simulate retinas of eyes of human to generate the image.

In some embodiments, the material of the flexible substrate 211 may include flexible polymer.

Any dielectric may have stress under effect of an external electric field (the field intensity of the electric field may be indicated by a symbol "E"). There is a linear relationship between magnitude of the stress and the square of E. Such effect is called as electrostriction effect. The above stress can cause the dielectric to produce the corresponding strain. The strain is called as electrostriction strain. The electrostriction strain is caused by polarization of the dielectric in the electric field and may occur in all of dielectric materials. The electrostriction effect has an advantage that its electric field-strain relationship is very stable. The electrostriction strain belongs to one of electrically induced deformation.

Because the flexible polymer, in particular polyurethane elastomer, can generate very large electrically induced strain and this strain is in direct proportion to square of the field intensity of the external electric field, the flexible substrate 211 may be produced by the flexible polymer, in particular polyurethane elastomer.

If the flexible substrate 211 is produced by the polyurethane elastomer, an organic polybasic isocyanate and a hydroxy terminated compound may be used as starting materials for forming a film-like polyurethane elastomer flexible substrate 211, through a pre-polymerization reaction and a chain-extension reaction.

Figure 6:
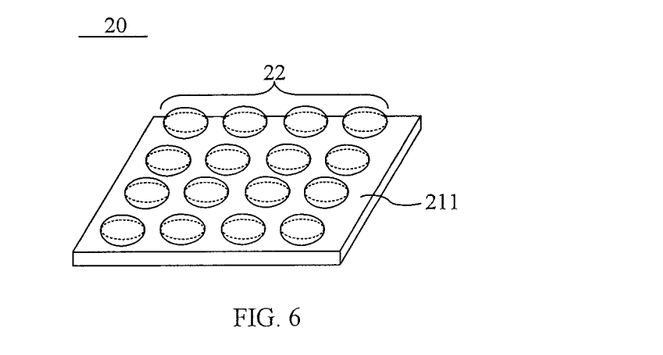
FIG. 6 is a schematic view showing another imaging device provided by some embodiments of the present disclosure.
Figure 11A:
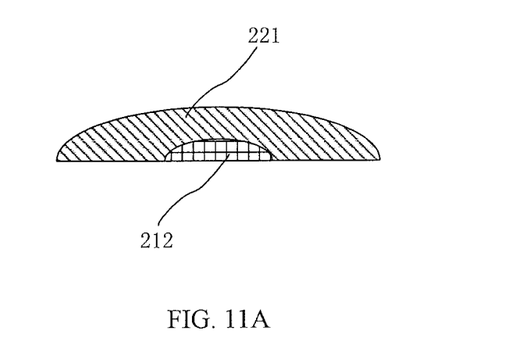
FIG. 11A and FIG. 11B schematically show a single micro lens and a single photosensitive element in an elastic micro lens array respectively.
Figure 11B:
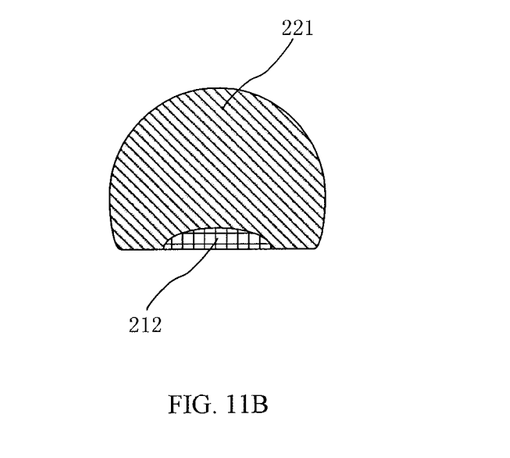

In a case where the material of the flexible substrate 211 includes the electrically-induced deformable flexible material, as shown in FIG. 6, the elastic micro lens array 22 is arranged on the flexible substrate 211 and arranged to cover the at least one photosensitive element 212. For example, different micro lenses 221 may cover different photosensitive elements 212 respectively, which may cause the photosensitive elements 212 to receive the light modulated by the micro lenses 221 as much as possible. FIG. 11A and FIG. 11B schematically show examples of two deformation states of single micro lens 221. In the embodiments, the micro lenses 221 cover the photosensitive elements 212 respectively. As discussed above, the shape (for example surface curvature) of the micro lenses 221 may be changed by the electrostriction effect. In FIG. 11A, the micro lens 221 has a smaller surface curvature and accordingly has a larger focal length. In FIG. 11B, the micro lens 221 has a larger surface curvature and accordingly has a smaller focal length. BY adjusting the shapes of the respective micro lenses 221, the focal lengths of the micro lenses 221 may be changed to adjust the focal lengths automatically by the electrostriction effect.

The elastic micro lens array 22 may be produced by a transparent polymer material, for example, PDMS (polydimethylsiloxane). The elastic micro lens array 22 may be produced by processes such as coating, exposure, developing and etching.

The elastic micro lens array 22 is arranged on the flexible substrate 211. In this way, when the flexible substrate 211 deforms, it can cause the elastic micro lens array 22 to deform, so as to adjust focal lengths of the micro lenses in the elastic micro lens array 22. In this way, by means of simple structure, it not only can simulate retinas of eyes of human to generate an image, but also can adjust the focal lengths of the micro lenses in the elastic micro lens array 22.

It should be noted that the elastic micro lens array 22 may be formed directly on the flexible substrate 211; alternatively, other layers may be formed at first on the flexible substrate 211, and then the elastic micro lens array 22 on these layers. However, if there are other layers between the elastic micro lens array 22 and the flexible substrate 211, it should ensure that the layers do not influence the deformation of the elastic micro lens array 22 caused by the flexible substrate 211.

Figure 7A:
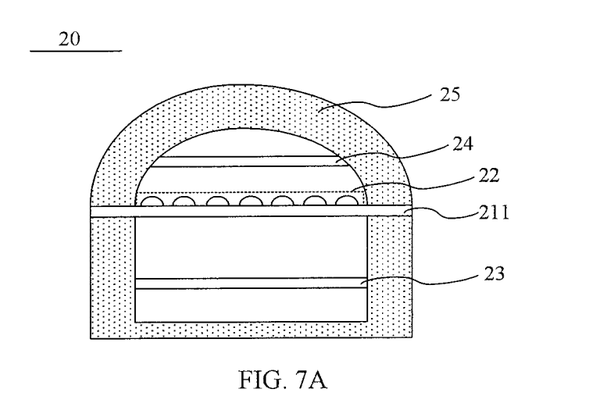
FIG. 7A is a schematic view showing a further imaging device provided by some embodiments of the present disclosure.

In view of the above, as shown in FIG. 7A, the imaging device 20 further includes a first electrode 23 and a second electrode 24; and the elastic micro lens array 22 and the flexible substrate 221 are arranged between the first electrode 23 and the second electrode 24. In some embodiments, there is a gap between both the elastic micro lens array 22 and the flexible substrate 221 and each of the first electrode 23 and the second electrode 24.

As discussed above, the electrostriction effect needs to be achieved by applying voltages. In some embodiments, the processor 30 is configured to control the voltages applied to the first electrode 23 and the second electrode 24 to adjust the focal lengths of the micro lenses in the elastic micro lens array 22.

In order to ensure transparency of the imaging device 20, the first electrode 23 and the second electrode 24 may be made from electrically conductive and very high transparent materials, for example, indium tin oxide (ITO). The first electrode 23 and the second electrode 24 may be produced by processes such as film plating, adhesive coating, exposure, developing, etching.

It should be understood that design of the gap between both the elastic micro lens array 22 and the flexible substrate 221 and each of the first electrode 23 and the second electrode 24 is intended to leave space for deformation of the flexible substrate 211.

Figure 7B:
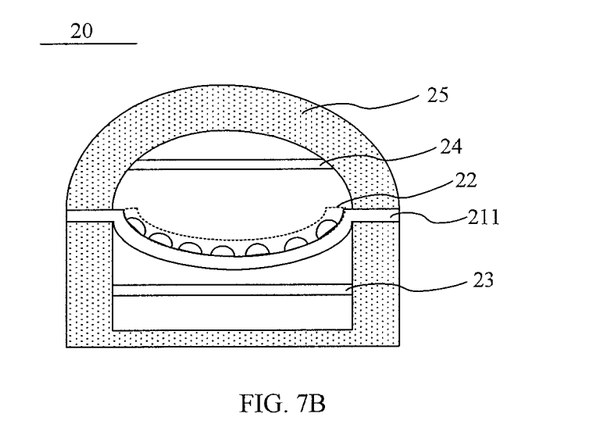
FIG. 7B is a schematic view showing an imaging device with voltages applied by a first electrode and a second electrode in the imaging device shown in FIG. 7A.

As shown in FIG. 7B, the processor 30 may cause the flexible substrate 211 to stretch and deform by controlling the voltage applied to the first electrode 23 and the second electrode 24 so as to adjust the focal lengths of the micro lenses in the elastic micro lens array 22.

Figure 8A:
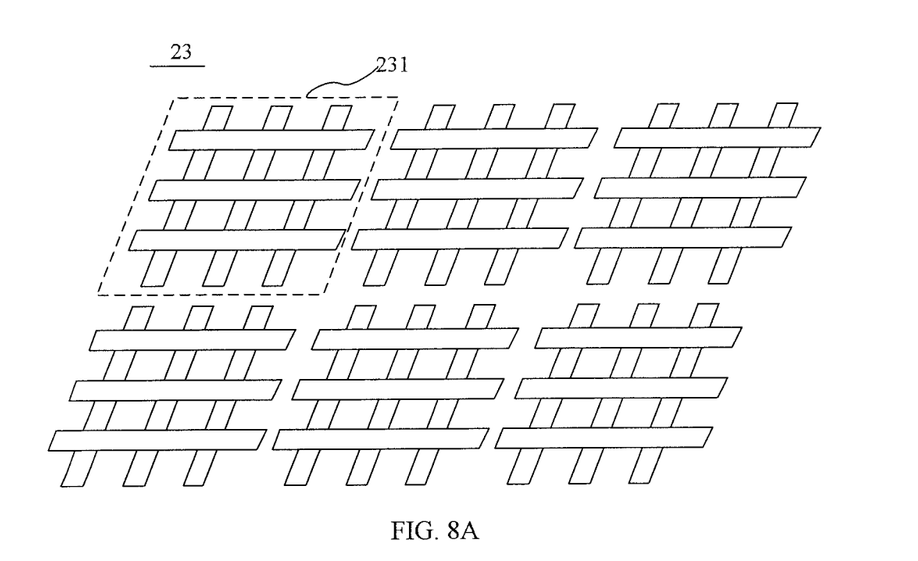
FIG. 8A is a schematic view showing a structure of a first electrode provided by some embodiments of the present disclosure.
Figure 8B:
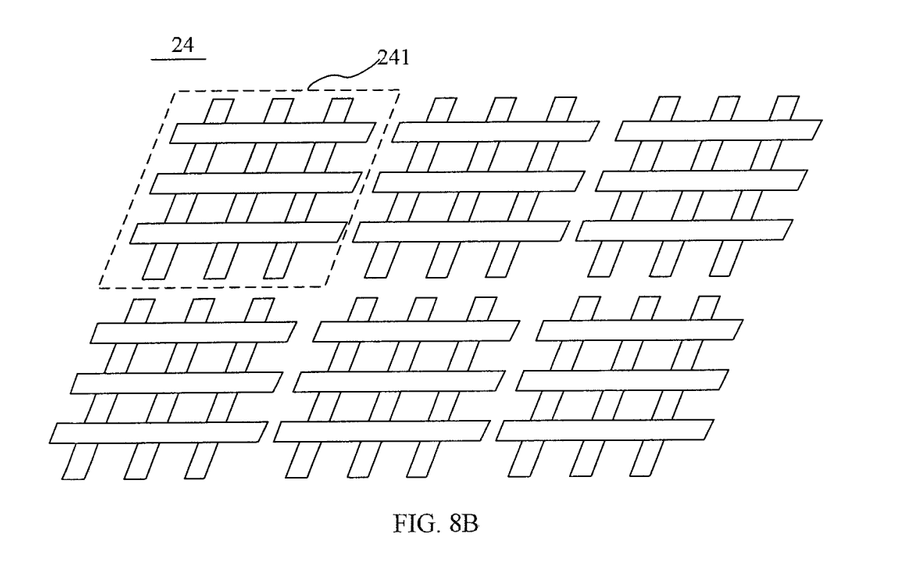
FIG. 8B is a schematic view showing a structure of a second electrode provided by some embodiments of the present disclosure.

In some embodiments, as shown in FIG. 8A, the first electrode 23 includes a plurality of first sub-electrodes 231 electrically insulated from each other. As shown in FIG. 8B, the second electrode 24 includes a plurality of second sub-electrodes 241 electrically insulated from each other. In some embodiments, each of the first sub-electrodes 231 and the second sub-electrodes 241 may have a mesh structure. However, shapes of the first sub-electrodes 231 and the second sub-electrodes 241 are not limited to this, for example, the first sub-electrodes 231 and the second sub-electrodes 241 may alternatively have other shapes.

By means of the mesh structure of the first electrode 23 and the second electrode 24, the total transmissivity of the imaging device 20 may increase. Further, the first electrode 23 is arranged to include the plurality of first sub-electrodes 231 electrically insulated from each other and the second electrode 24 is arranged to include the plurality of second sub-electrodes 241 electrically insulated from each other. In this way, it is easy to control the flexible substrate 211 to have different curve extents in different areas such that expected deformations can be obtained by the voltages applied to the first electrode 23 and the second electrode 24.

In some embodiments, the processor 30 may be configured to acquire the predetermined image data (for example tensors of a picture) and process the acquired predetermined image data by a neural work model to optimize the focal lengths of the lenses in the elastic micro lens array such that the images shown by the display device 60 becomes clear.

It is assumed that the above predetermined image data are involved to R (red) G (green) B (blue) colored pictures and any one RGB colored picture may be represented as one three-dimensional tensor with three dimensions, i.e., height, width and color data of the picture.

Figure 4:
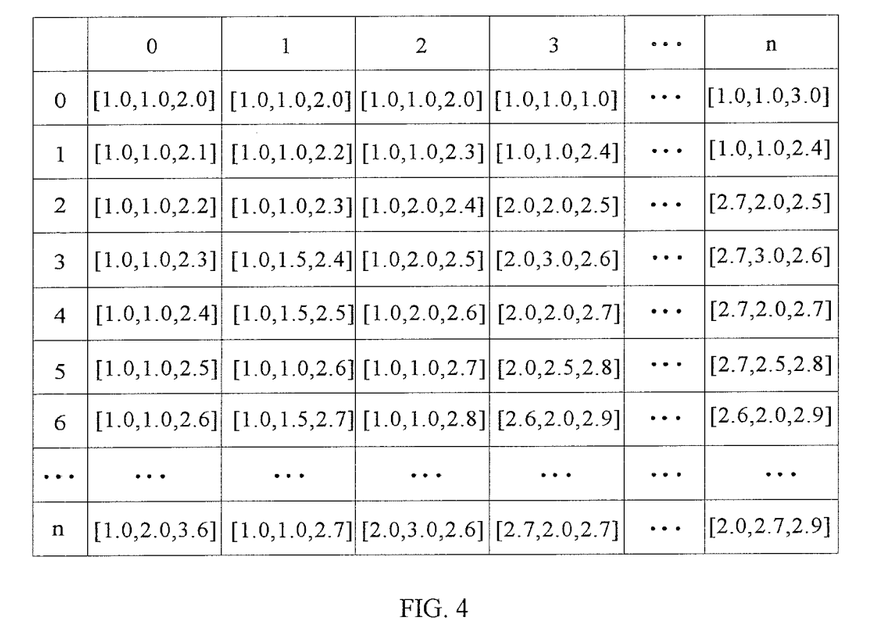
FIG. 4 shows a tensor of colors of a picture provided by some embodiments of the present disclosure.

The RGB color picture may be divided into three pictures, i.e., a red picture, a green picture and a blue picture, on a basis of RGB three-primary colors. If it is represented in a form of tensor, then the tensor for representing the color of picture can be provided shown in FIG. 4. In the table shown in FIG. 4, each cell represents one pixel point where [1.0, 0, 0] indicates red, [0, 1.0, 0] indicates green, and [0, 0, 1.0] indicates blue.

In view of above, it may be extended as required. For example, one data set containing a plurality of pictures may be represented by a four dimensional tensor where the four dimensions are the number of the picture in the data set, and height, width and color data of the picture respectively.

After the tensors of the pictures are acquired, mathematical manipulation and process are performed on the acquired tensors by the neural network model. By continuous "learning", the deviation between actual output results and the expected results of the neural network can be corrected continuously. The process of correcting the actual outputting results of the neural network is also the process of adjusting the focal lengths of micro lenses in the elastic micro lens array 22 until the display image becomes clear finally.

In some embodiments, the neural network model may be a BP (Back Propagation) neural network model.

Figure 5A:
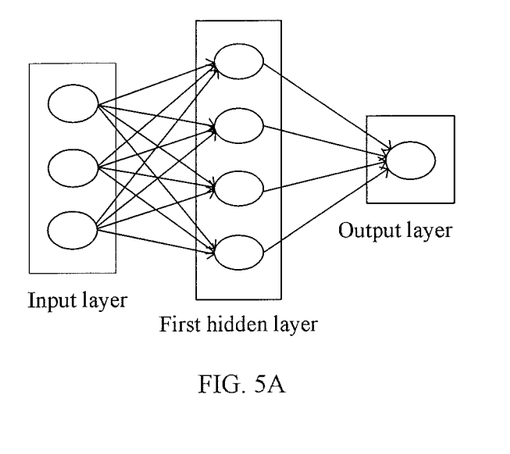
FIG. 5A is a schematic view showing a BP neural network model provided by some embodiments of the present disclosure.
Figure 5B:
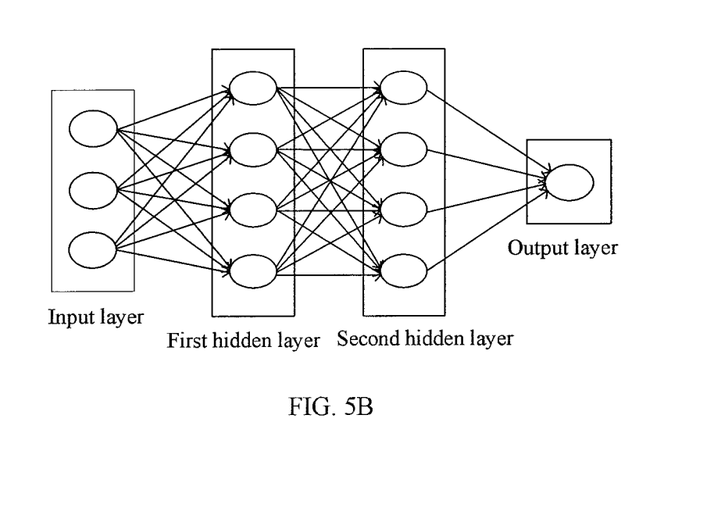
FIG. 5B is a schematic view showing another BP neural network model provided by some embodiments of the present disclosure.

FIG. 5A and FIG. 5B show an example of a basic architecture of the BP neural network model. FIG. 5A schematically shows only one hidden layer while FIG. 5B schematically shows two hidden layers (i.e., a first hidden layer and a second hidden layer). However, embodiments of the present disclosure are not limited to this in practice, and alternatively, more than two hidden layers may be provided.

In embodiments of the present disclosure, the data of the picture are represented by tensors and then inputted into the neural network model to be processed subsequently. It is a very efficient strategy. Because if such step is absent, it will need to define all kinds of data operations for various types of data organization forms so as to waste large efforts of developers.

In addition, in the embodiments of the present disclosure, self-adjusting function for the focal lengths can be achieved better by artificial intelligence algorithm. In comparison with the customary database contrast, the embodiments of the present disclosure can reproduce the images effectively and faithfully to enhance the user's experiences.

In some embodiments, as shown in FIG. 7A, the imaging portion 20 may further include a cavity 25. The elastic micro lens array 22, the flexible substrate 211, the imaging portion 21, the first electrode 23 and the second electrode 24 are encapsulated in the cavity 25.

The cavity 25 has the main function of encapsulating the elastic micro lens array 22, the flexible substrate 211, the imaging portion 21, the first electrode 23 and the second electrode 24, and so on effectively. The material of the cavity 25 may include transparent polymer material, for example, PMMA (methyl methacrylate). The cavity 25 may have various shapes, for example a circle shape.

Figure 1:
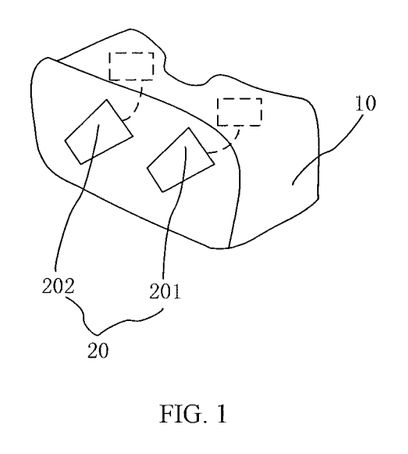
FIG. 1 is a schematic view showing a virtual reality device provided by some embodiments of the present disclosure.
Figure 2:
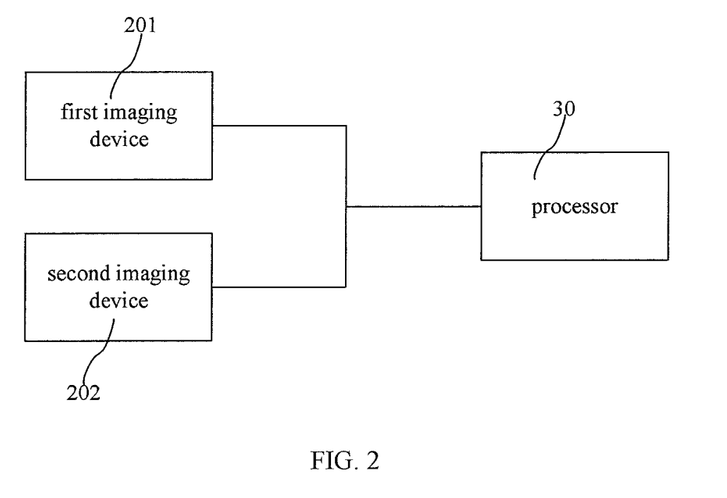
FIG. 2 shows connection between an imaging device and a processor in a virtual reality device provided by some embodiments of the present disclosure.
Figure 9:
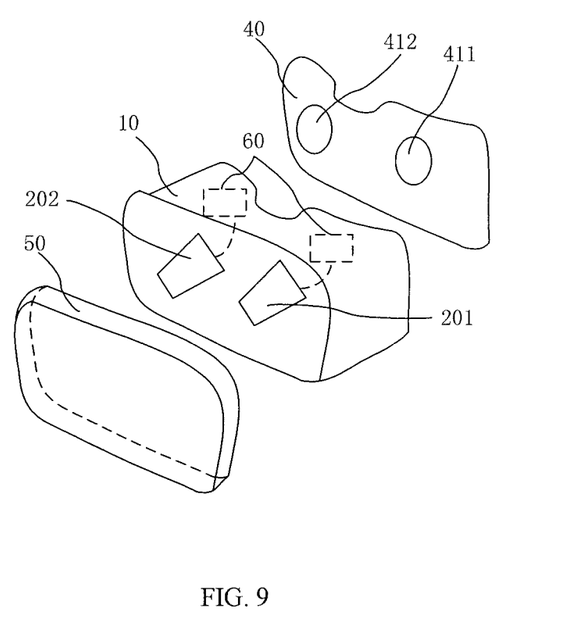
FIG. 9 is a schematic view showing another virtual reality device provided by some embodiments of the present disclosure.

In some embodiments, the imaging device 20 for example may be transparent to increase optical efficiency. In some embodiments, the virtual reality device may further include a frame 10. The first imaging device 201 and the second imaging device 202 may be arranged in the frame 10 and separated from each other, as shown in FIG. 1. In some embodiments, as shown in FIG. 9, the virtual reality device further includes a main observation board 40. The main observation board 40 includes two through holes corresponding to two eyes of human in position, i.e., a first through hole 411 for left eye's observation and a second through hole 412 for right eye's observation. The two imaging devices 20 are in one to one correspondence to the two through holes. For example, an orthographic projection of the first imaging device 201 on the main observation board 40 at least partly overlaps the first through hole 411 and an orthographic projection of the second imaging device 202 on the main observation board 40 at least partly overlaps the second through hole 412. In some embodiments, a groove 50 for receiving a cell phone is arranged on a front end of the frame 10 facing away from the main observation board 40, or the groove 50 is arranged on a side of the frame 10 facing away from the main observation board 40.

In view of this, when the user uses the virtual reality device, the user can put a cell phone into the groove 50 while keeping a screen of the cell phone facing towards the main observation board 40 and keeping two eyes corresponding to the first through hole 411 and the second through hole 412 of the main observation board 40. In this way, the user can use the virtual reality device easily and conveniently. Such virtual reality device is suitable to all kinds of users.

Embodiments of the present disclosure also provide a method for adjusting focal lengths automatically used in the virtual reality device as described above. The method includes: adjusting focal lengths of micro lenses in the elastic micro lens array 22 depending on predetermined image data until the display device displays a clear image. The above process of adjusting focal lengths is automatic without manual adjustments and adjustments based on external devices, thus it can allow the virtual reality device to be more independent. It can improve the user's experiences.

In some embodiments, the step of adjusting focal lengths of micro lenses in the elastic micro lens array 22 depending on predetermined image data until the display device displays the clear image includes: acquiring the predetermined image data and processing the acquired predetermined image data by a neural work model to optimize the focal lengths of the lenses in the elastic micro lens array.

The tensor of picture and the neural work model have been explained in the previous paragraphs of the description. Therefore, the details thereof will be omitted herein.

In view of the above, on a basis of the neural work model and by continuous "learning", the deviation between actual output results and the expected results of the neural network can be corrected continuously depending on the corresponding arithmetic models. The process of correcting the actual outputting results of the neural network is also the process of adjusting the focal lengths of micro lenses in the elastic micro lens array 22 until the displayed image becomes clear finally.

Taking the BP neural network model shown in FIG. 5A as an example, the neural network is composed of three parts, i.e., a leftmost input layer, an intermediate hidden layer and a rightmost output layer respectively. Adjacent two of the input layer, the hidden layer and the output layer are connected by connecting lines and each of the connecting lines has one corresponding weight value.

Further, at first, the weight values of the neural network are initialized. Then, output values corresponding to all of input quantities are calculated using the initialized weight values. Next, the output values are compared with an expected value. If the comparison result is lower than a threshold, it will need to correct the weight values of the neural network, so that the output values corresponding to all of input quantities are recalculated using the updated weight values, so as to repeat the above steps until the comparison result is larger than or equal to the threshold.

The weight values of the neural network are numeral values associated with physical quantities involved to the deformation of the elastic micro lens array 22, for example, they may reflect the physical quantities such as shear stress, strain and control voltage (for example the voltage applied between the first electrode and the second electrode on both sides of the elastic micro lens array) of the lens. In practice, the specific physical quantities may be measured by experiments for predetermined standard images, so as to establish relationship between the weight values and these physical quantities. In this way, the correction for the weight values of the neural network may be associated with adjustment of the physical quantities. Optimal weight values may be acquired by continuous self learning of the neural network. The required physical quantities may be derived from the optimal weight values, so as to adjust the focal length(s) of the micro lens in the elastic micro lens array 22.

A simple example of algorithm of neural network will be given below, as represented by Equation (1).

$$X \cdot F(x) * W = P \qquad \text{Equation (1)}$$

where X is an input quantity, for example, a tensor of a picture. For example, it is assumed that X may be represented as a 4×3 matrix such as:

$$X = \begin{bmatrix} x_{11} & x_{12} & x_{13} \\ x_{21} & x_{22} & x_{23} \\ x_{31} & x_{32} & x_{33} \\ x_{41} & x_{42} & x_{43} \end{bmatrix} \qquad \text{Equation (2)}$$

F(x) is a threshold function, for example, $$F(x) = \frac{1}{1 + e^{-(wx+b)}} \qquad \text{Equation (3)}$$

where w and b are coefficients that can be selected as required.

W is a weight matrix, for example, which may be represented as a 3×2 matrix:

$$W = \begin{bmatrix} w_{11} & w_{12} \\ w_{21} & w_{22} \\ w_{31} & w_{32} \end{bmatrix} \quad \text{Equation (4)}$$

P is an output quantity, for example, which may be represented as a 4×2 matrix:

$$P = \begin{bmatrix} p_{11} & p_{12} \\ p_{21} & p_{22} \\ p_{31} & p_{32} \\ p_{41} & p_{42} \end{bmatrix} \quad \text{Equation (5)}$$

"X·F(x)" in Equation (1) means that each of elements in the matrix X is put into the threshold function F(x) as an independent variable to form a new matrix having the same number of rows and the same number of columns as the matrix X. The operator "*" in Equation (1) represents matrix multiplication.

If the output quantity P fails to fall within the expected range, the weight values will be adjusted continuously to correct the model so as to obtain the output quantity falling within the expected range finally.

The above example of algorithm of neural network is only exemplified. Embodiments of the present disclosure are not limited to this. Alternatively, any known algorithms of neural network may be used in the present disclosure to achieve adjustments of focal lengths.

In some embodiments of the present disclosure, the imaging device 20 including the imaging portion 21 and the elastic micro lens array 22 is arranged in the virtual reality device and the imaging portion simulates the retinas of eyes of human to generate an image, which may be similar to imaging of the eyes. In this way, when the processor 30 adjusts the focal lengths of the lenses in the elastic micro lens array 22 until a clear image can be generated from the electrical imaging signal outputted by the imaging portion 21, the user may see the clear image so that the virtual reality device according to the embodiments of the present disclosure can have better immersing effects. In addition, the above process of adjusting focal lengths is automatic without manual adjustments and adjustments based on any external devices, thus it can allow the virtual reality device to be more independent. It can improve the user's experiences.

The skilled person in the art can understand: all or part of steps for achieving the above embodiments of method may be implemented by hardware associated with program instructions. The program may be stored in a computer readable storage medium. The program is configured to perform the method as described in any one of the above embodiments when it is executed. The storage medium may include: all kinds of media on which program codes may be stored, such as ROM, RAM, magnetic discs or optical discs.

Figure 10:
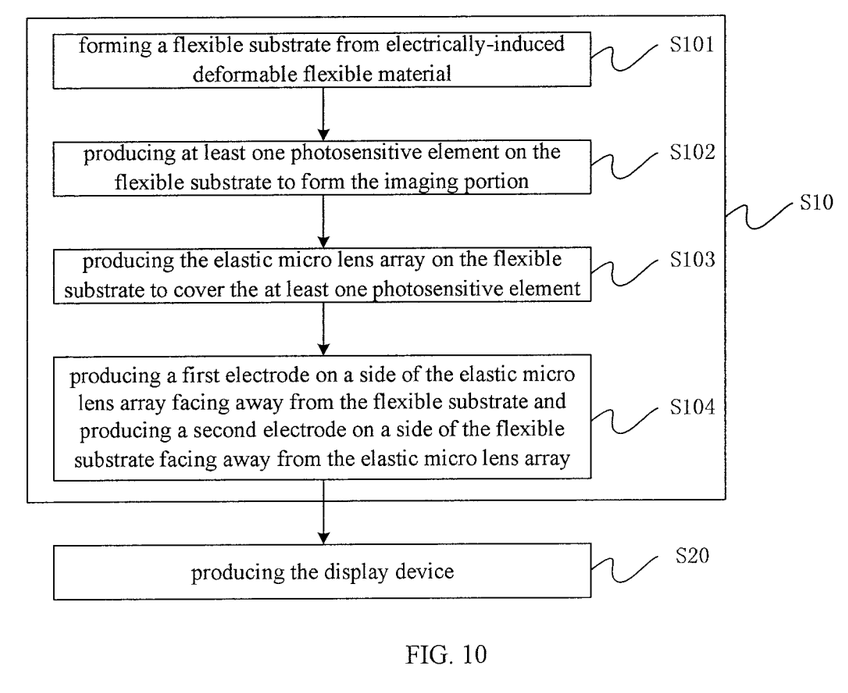
FIG. 10 is a flow chart showing a method for producing a virtual reality device provided by some embodiments of the present disclosure.

Embodiments of the present disclosure also provide a method for producing the virtual reality device. As shown in FIG. 10, the method further includes:

Step S10: producing at least one imaging device including the imaging portion and the elastic micro lens array, the elastic micro lens array being arranged on the light incident side of the imaging portion; and Step S20: producing the display device.

As discussed above, the elastic micro lens array has lenses which have independently adjustable focal lengths.

In some embodiments, the Step S10 includes:

Sub-step S101: forming a flexible substrate from electrically-induced deformable flexible material;

Sub-step S102: producing at least one photosensitive element on the flexible substrate to form the imaging portion;

Sub-step S103: producing the elastic micro lens array on the flexible substrate to cover the at least one photosensitive element; and Sub-step S104: producing a first electrode on a side of the elastic micro lens array facing away from the flexible substrate and producing a second electrode on a side of the flexible substrate facing away from the elastic micro lens array.

In some embodiments, an organic polybasic isocyanate and a hydroxy terminated compound may be used as starting materials for forming a film-like polyurethane elastomer flexible substrate 211, through a pre-polymerization reaction and a chain-extension reaction. As discussed above, the photosensitive elements 212 may be produced by the same process as those for producing diodes, or may be produced by the same process as those for producing thin film transistors well-known in the semiconductor industry. The elastic micro lens array 22 may be produced by a transparent polymer material, for example, PDMS (polydimethylsiloxane). The elastic micro lens array 22 may be produced by processes such as coating, exposure, developing and etching. The first electrode 23 and the second electrode 24 should be made from electrically conductive and very high transparent materials, for example, indium tin oxide (ITO). The first electrode 23 and the second electrode 24 may be produced by processes such as film plating, adhesive coating, exposure, developing, etching.

In some embodiments, the method may further include steps such as producing a cavity 25 and a frame 10. The material of the cavity 25 may include a transparent polymer material, for example, PMMA (methyl methacrylate). The cavity 25 may have various shapes, for example a circle shape. The frame 10 may be produced by known conventional methods.

The above description only gives the specific embodiments of the present disclosure, but the scope of the present disclosure is not limited to this. Under the present disclosure, changes or modifications which can be readily envisaged by those skilled in the art shall fall within the scope of the present disclosure. Thus, the scope of present disclosure is defined by the appended claims and their equivalents.

What is claimed is:

1. A virtual reality device, comprising:
   at least one imaging device comprising an imaging portion and an elastic micro lens array, the elastic micro lens array being arranged at a light incident side of the imaging portion and configured to modulate an incident light, and the imaging portion being configured to receive the incident light modulated by the elastic micro lens array and to convert intensity of the incident light into an electrical imaging signal, the imaging portion comprising at least one photosensitive element on the flexible substrate; and
   a display device configured to generate a visual image from the electrical imaging signal outputted by the imaging portion, the imaging device comprising a flexible substrate made from an electrically-induced deformable flexible material,
   wherein the elastic micro lens array has lenses which have independently adjustable focal lengths, and wherein the imaging device further comprises a first electrode and a second electrode;
the elastic micro lens array and the flexible substrate are arranged between the first electrode and the second electrode, and
wherein the virtual reality device further comprises a processor configured to adjust the focal lengths of the lenses in the elastic micro lens array by controlling voltages applied to the first electrode and the second electrode.

2. The virtual reality device of claim 1, further comprising:
a processor configured to adjust the focal lengths of the lenses in the elastic micro lens array depending on predetermined image data.

3. The virtual reality device of claim 2, wherein the processor is further configured to acquire the predetermined image data and process the acquired predetermined image data by a neural work model to optimize the focal lengths of the lenses in the elastic micro lens array.

4. The virtual reality device of claim 1, wherein the elastic micro lens array is arranged on the flexible substrate to cover the at least one photosensitive element.

5. The virtual reality device of claim 1, wherein the elastic micro lens array and the flexible substrate are spaced from each of the first electrode and the second electrode.

6. The virtual reality device of claim 1, wherein the first electrode comprises a plurality of first sub-electrodes electrically insulated from each other; and
wherein the second electrode comprises a plurality of second sub-electrodes electrically insulated from each other.

7. The virtual reality device of claim 6, wherein each of the first sub-electrodes and the second sub-electrodes has a mesh structure.

8. The virtual reality device of claim 1, wherein the imaging portion further comprises a cavity, the elastic micro lens array, the flexible substrate, the imaging portion, the first electrode and the second electrode being encapsulated in the cavity.

9. The virtual reality device of claim 1, wherein the electrically-induced deformable flexible material comprises polyurethane elastomer.

10. The virtual reality device of claim 1, wherein a material of the elastic micro lens array comprises a transparent polymer material.

11. The virtual reality device of claim 1, wherein the imaging device is transparent.

12. The virtual reality device of claim 1, further comprising a frame,
wherein the at least one imaging device comprises a first imaging device and a second imaging device arranged within the frame and separated from each other.

13. The virtual reality device of claim 12, further comprising:
a main observation board comprising a first through hole for left eye's observation and a second through hole for right eye's observation; and
a groove for receiving a cell phone, the groove being arranged on a side of the frame facing away from the main observation board,
wherein an orthographic projection of the first imaging device on the main observation board at least partly overlaps the first through hole and an orthographic projection of the second imaging device on the main observation board at least partly overlaps the second through hole.

14. A method for adjusting focal lengths automatically used in the virtual reality device of claim 1, the method comprising:
adjusting the focal lengths of micro lenses in the elastic micro lens array depending on the predetermined image data until the display device displays a clear image.

15. The method of claim 14, wherein the adjusting the focal lengths of micro lenses in the elastic micro lens array depending on the predetermined image data until the display device displays a clear image comprises:
acquiring the predetermined image data and processing the acquired predetermined image data by a neural work model to optimize the focal lengths of the lenses in the elastic micro lens array.

16. A non-transitory computer readable medium on which a computer program is stored, the computer program being configured to perform the method of claim 14 when the computer program is executed.

17. A method for producing the virtual reality device of claim 1, the method comprising:
producing at least one imaging device comprising the imaging portion and the elastic micro lens array, and arranging the elastic micro lens array on the light incident side of the imaging portion; and
producing the display device,
wherein the producing at least one imaging device comprises:
forming a flexible substrate form an electrically-induced formable flexible material;
producing at least one photosensitive element on the flexible substrate to form the imaging portion;
producing the elastic micro lens array on the flexible substrate to cover the at least one photosensitive element; and
producing a first electrode on a side of the elastic micro lens array facing away from the flexible substrate and producing a second electrode on a side of the flexible substrate facing away from the elastic micro lens array.

* * * * *